United States Patent
Yu et al.

(10) Patent No.: US 9,007,659 B1
(45) Date of Patent: Apr. 14, 2015

(54) RE-ORDERED ERROR DIFFUSION FOR FAST IMPLEMENTATION

(71) Applicant: Xerox Corporation, Norwalk, CT (US)

(72) Inventors: Chao Yu, San Jose, CA (US); Xing Li, Webster, NY (US); David J. Metcalfe, Marion, NY (US)

(73) Assignee: Xerox Corporation, Norwark, CT (US)

(*) Notice: Subject to any disclaimer, the term of this patent is extended or adjusted under 35 U.S.C. 154(b) by 0 days.

(21) Appl. No.: 14/107,327

(22) Filed: Dec. 16, 2013

(51) Int. Cl.
*H04N 1/405* (2006.01)
*H04N 1/32* (2006.01)

(52) U.S. Cl.
CPC ......... *H04N 1/4052* (2013.01); *H04N 1/32571* (2013.01); *H04N 2201/0454* (2013.01); *H04N 2201/042* (2013.01)

(58) Field of Classification Search
None
See application file for complete search history.

(56) References Cited

U.S. PATENT DOCUMENTS

| | | | |
|---|---|---|---|
| 5,519,791 A | 5/1996 | Webb et al. | |
| 5,553,165 A | 9/1996 | Webb et al. | |
| 5,892,851 A | 4/1999 | Nguyen | |
| 5,974,228 A * | 10/1999 | Heitsch | 358/1.9 |
| 6,201,612 B1 * | 3/2001 | Matsushiro et al. | 358/1.9 |
| 6,307,978 B1 | 10/2001 | Metaxas | |
| 8,363,278 B2 * | 1/2013 | Liu et al. | 358/3.03 |
| 2006/0232821 A1 | 10/2006 | Ranganathan | |
| 2012/0051659 A1 * | 3/2012 | Ashida | 382/252 |
| 2012/0218573 A1 * | 8/2012 | Otsuka et al. | 358/1.9 |
| 2014/0125681 A1 * | 5/2014 | Li | 345/505 |

* cited by examiner

*Primary Examiner* — Scott A Rogers

(57) ABSTRACT

A method, non-transitory computer readable medium, and apparatus for performing error diffusion are disclosed. For example, the method quantizes an error for a first pixel of a plurality of pixels in a first row, diffuses the error to an adjacent pixel of the plurality of pixels in the first row, performs the quantizing and the diffusing for each remaining pixel of the plurality of pixels in the first row and applies the error that is quantized for each one of the plurality of pixels the first row in a desired number of different directions in a plurality of parallel operations that is equal to the desired number of different directions.

20 Claims, 3 Drawing Sheets

RE-ORDERED ERROR DIFFUSION FOR FAST IMPLEMENTATION

The present disclosure relates generally to improving speed of and performance of a print and copy image path and, more particularly, to a method and an apparatus for performing error diffusion.

BACKGROUND

Error diffusion is a major component in modern print and copy image path to render continuous tone image to halftone images. The computational cost of error diffusion is potentially a bottleneck of overall system throughput. Therefore, acceleration techniques for error diffusion are of considerable interest.

Some acceleration techniques have been created, but cause artifacts at boundaries of each image block. Other approaches rely on a wave-front scheduling to avoid artifacts, but have high implementation complexity. These approaches provide the same image quality as an un-accelerated error diffusion implementation, but at a high computational cost.

SUMMARY

According to aspects illustrated herein, there are provided a method, a non-transitory computer readable medium, and an apparatus for performing error diffusion. One disclosed feature of the embodiments is a method that quantizes an error for a first pixel of a plurality of pixels in a first row, diffuses the error to an adjacent pixel of the plurality of pixels in the first row, performs the quantizing and the diffusing for each remaining pixel of the plurality of pixels in the first row and applies the error that is quantized for each one of the plurality of pixels the first row in a desired number of different directions in a plurality of parallel operations that is equal to the desired number of different directions.

Another disclosed feature of the embodiments is a non-transitory computer-readable medium having stored thereon a plurality of instructions, the plurality of instructions including instructions which, when executed by a processor, cause the processor to perform an operation that quantizes an error for a first pixel of a plurality of pixels in a first row, diffuses the error to an adjacent pixel of the plurality of pixels in the first row, performs the quantizing and the diffusing for each remaining pixel of the plurality of pixels in the first row and applies the error that is quantized for each one of the plurality of pixels the first row in a desired number of different directions in a plurality of parallel operations that is equal to the desired number of different directions.

Another disclosed feature of the embodiments is an apparatus comprising a processor and a computer readable medium storing a plurality of instructions which, when executed by the processor, cause the processor to perform an operation that quantizes an error for a first pixel of a plurality of pixels in a first row, diffuses the error to an adjacent pixel of the plurality of pixels in the first row, performs the quantizing and the diffusing for each remaining pixel of the plurality of pixels in the first row and applies the error that is quantized for each one of the plurality of pixels the first row in a desired number of different directions in a plurality of parallel operations that is equal to the desired number of different directions.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for performing error diffusion. As discussed above, error diffusion is a major component in modern print and copy image path to render continuous tone image to halftone images. The computational cost of error diffusion is potentially a bottleneck of overall system throughput. Therefore, acceleration techniques for error diffusion are of considerable interest.

Currently when error diffusion is performed, the error diffusion for k directions of N pixels per row takes kN multiplications and kN additions for accumulating the quantization error. However, to improve the speed of the error diffusion without sacrificing any of the image quality, a re-ordered error diffusion process is disclosed herein. The re-ordered error diffusion process may reduce the error diffusion for the same k directions of N pixels per row to N multiplications and k additions performed in a first step, followed by a second step of (k−1) parallel operations of multiplications and additions.

In one embodiment, it was found that the re-ordered error diffusion reduces processing times significantly. The re-ordered error diffusion method may be applied to images to improve the processing times of error diffusion over the currently used error diffusion methods. For example, when evaluated on a single instruction multiple data (SIMD) processor with 896 word-width, direct error diffusion for an image of 512×512 pixels took an average of 80 clock cycles per pixel versus 23 clock cycles using the re-ordered error diffusion. The proposed method in the present disclosure is nearly four times faster.

Figure 2:
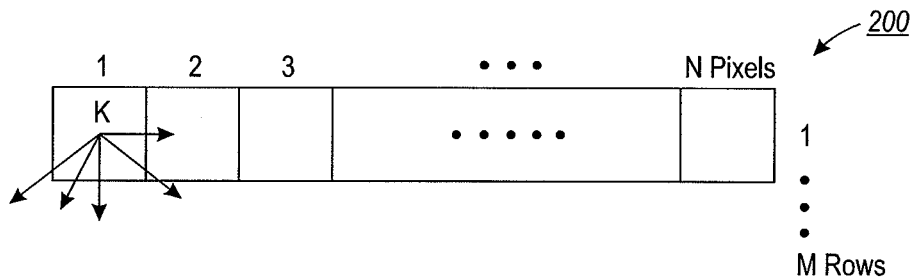
FIG. 2 illustrates an example block diagram of how the error diffusion is performed in the prior art.

FIG. 2 illustrates an example block diagram of how the error diffusion is performed in the prior art on a scan line 200 of N pixels and M rows of lines 200. For example, as noted above, the prior art quantizes the error of each pixel and diffuses the error in k directions immediately after the quantization of the error. Thus, the prior art method performs k*N multiplication operations and k*N addition operations.

Figure 1:
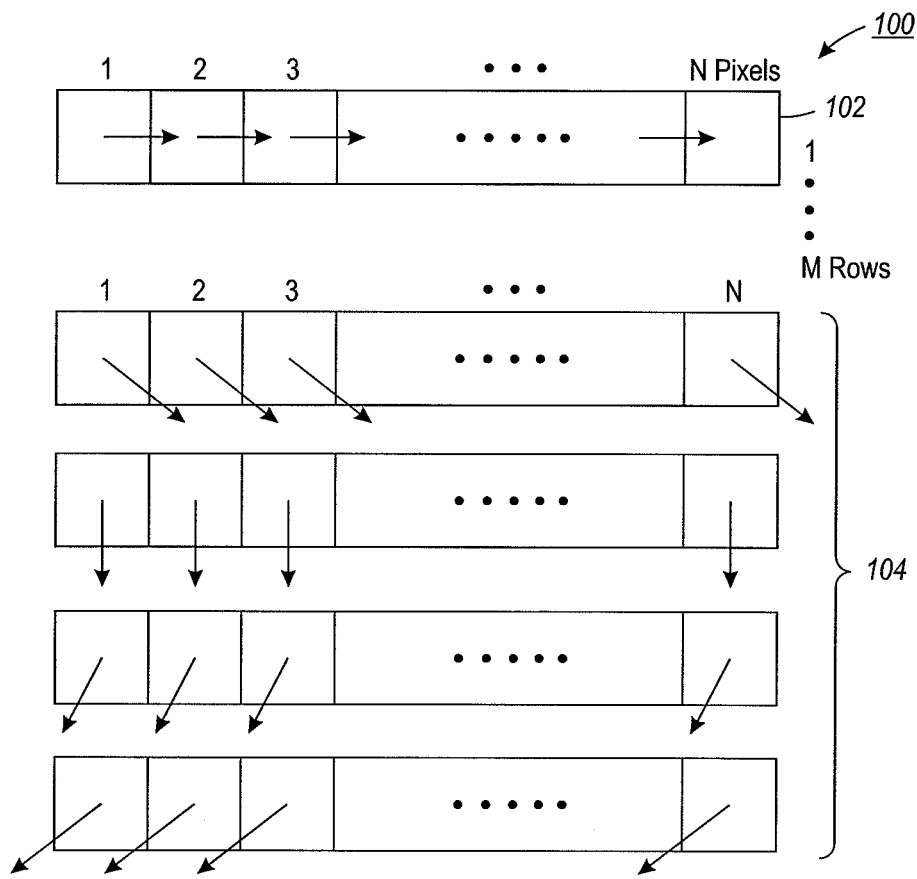
FIG. 1 illustrates an example block diagram of how the error diffusion is re-ordered.

In contrast, FIG. 1 illustrates an example block diagram of how the error diffusion is re-ordered for a scan line 100 having N pixels and M rows of lines 100 that improves error diffusion processing times over the methods used as illustrated in FIG. 2. The total number of N pixels may be divided into several groups of pixels per row. For example, if there are 500 total pixels of 100 pixels per 5 rows, then the re-ordered error diffusion would process the first 100 pixels of the first row, the second 100 pixels of the second row and so forth until the error diffusion is complete using the re-ordered diffusion method disclosed herein. In one embodiment, the re-ordered error diffusion method quantizes the error of each pixel 1 to $N_{row(m)}$ for rows 1 to m (where the sum of each pixel in rows $N_{row(1)}$ to $N_{row(m)}$=N pixels) horizontally in a direction of a scanning order as illustrated in step 102.

Subsequently, the re-ordered error diffusion method diffuses the error from step 102 of the same row in k−1 directions by simultaneously performing k−1 parallel operations as grouped by step 104. For example, an SIMD processor may be used to execute the k−1 parallel operations. The re-ordered error diffusion method only performs N multiplication operations and N addition operations with the additional k−1 parallel operations executed by the SIMD processor. As a result, the number of operations is greatly reduced without degrading any image quality over the prior art methods illustrated in FIG. 2.

Figure 3:
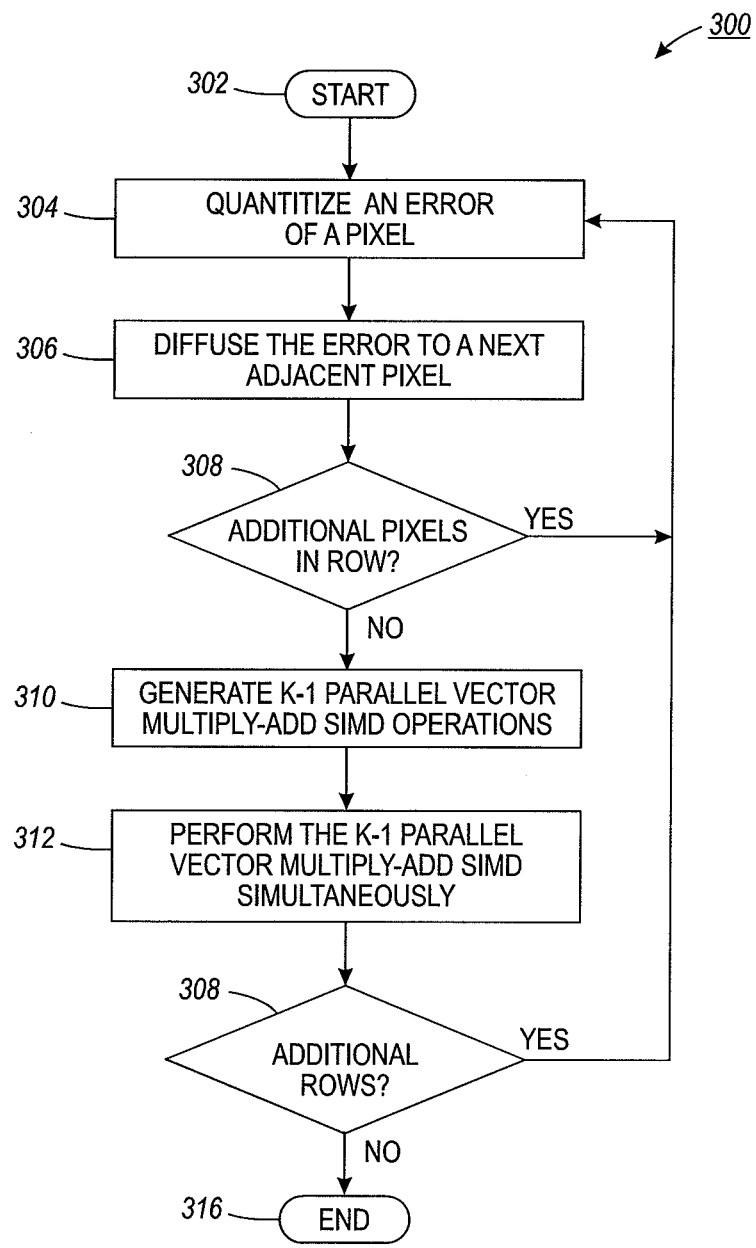
FIG. 3 illustrates an example flowchart of a method for performing error diffusion.
Figure 4:
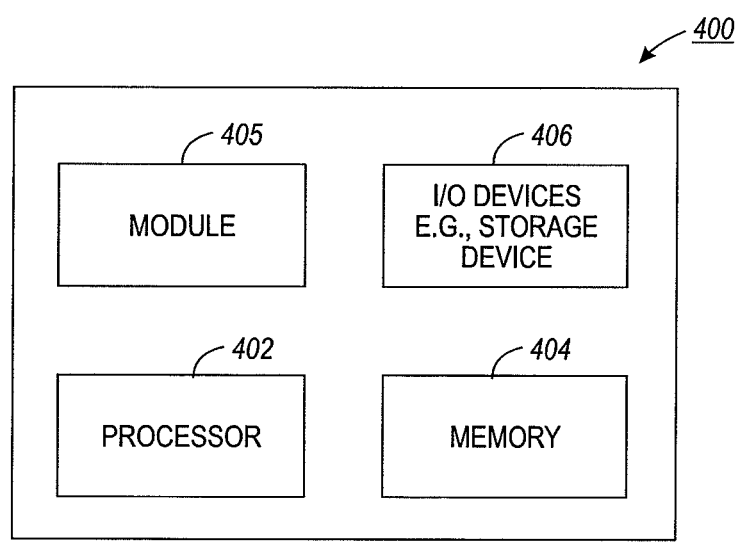
FIG. 4 illustrates a high-level block diagram of a general-purpose computer suitable for use in performing the functions described herein.

FIG. 3 illustrates a flowchart of a method 300 for performing a re-ordered error diffusion. In one embodiment, one or more steps or operations of the method 300 may be performed by a digital front end (DFE) having an SIMD processor or a general-purpose computer 400 having a SIMD as illustrated in FIG. 4 and discussed below.

The method 300 begins at step 302. At step 304, the method 300 quantizes an error of a pixel. For example, the error may be a quantization error associated with converting a pixel of an image into a two bit or multi-bit representation. In one embodiment, the image may be an image that is being converted into a half-tone image.

At step 306, the method 300 diffuses the error to a next adjacent pixel. For example, the next adjacent pixel may be in a direction of a horizontal scan order. For example, if a raster scan order is being used, the next adjacent pixel may always be a pixel to a right of the current pixel. In another example, if a serpentine scan order is being used, the next adjacent pixel may be either a pixel to a right of the current pixel or a left of the current pixel.

In one embodiment, the amount of the error that is being diffused to the next adjacent pixel may depend on the number of directions that is being used for the diffusion. For example, if the diffusion is in four directions, the diffusion to the next horizontal scan order may be one half of the quantization error.

At step 308, the method 300 determines if there are any additional pixels in the current row. If there are additional pixels, the method 300 may return to step 304 and repeat steps 304 and 306 until all of the pixels in the current row are processed. However, if there are no additional pixels in the current row, the method 300 may proceed to step 310.

At step 310, the method 300 generates k−1 parallel vector multiply-add SIMD operations. For example, unlike the prior methods that perform k multiplications and adds for each of the N pixels, resulting in a total of kN multiplications and adds, the method 300 of the present disclosure only requires N multiplications and N adds for the horizontal direction and one SIMD operation for each of the remaining k−1 directions.

In one embodiment, the value of k may correspond to a desired or predefined number of different directions for the error diffusion. For example, if the error will be diffused to an adjacent pixel and four adjacent pixels below the current pixel, the value of k may be 5.

At step 312, the method 300 performs the k−1 parallel vector multiply-add SIMD operations simultaneously. For example, taking advantage of the parallel processing capability of the SIMD processors, the method 300 may perform N multiplications and N adds for the horizontal direction and one SIMD operation for each of the remaining k−1 directions in parallel for the error diffusion. In other words, the method 300 re-orders the error diffusion of previous methods by splitting the multiplication and add operations for each pixel of a row into two separate steps rather than performing the multiplication and add in all k directions for each pixel one at a time in a direction of a horizontal scan order.

At step 314, the method 300 determines if there are any additional rows. If there are additional rows, the method 300 may proceed to step 304, where the method 300 is repeated for each pixel of the next row. If there are no additional rows, the method 300 proceeds to step 316. At step 316, the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. In one embodiment, the genera-purpose computer may be a digital front end (DFE) of a printing process or image path.

As depicted in FIG. 4, the system 400 comprises a processor element 402 (e.g., a SIMD, a CPU, and the like), a memory 404, e.g., random access memory (RAM) and/or read only memory (ROM), a module 405 for performing a re-ordered error diffusion, and various input/output devices 406 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for performing a re-ordered error diffusion can be loaded into memory 404 and executed by processor 402 to implement the functions as discussed above. As such, the present method 405 for performing a re-ordered error diffusion (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for performing error diffusion, comprising:
   quantizing, by a processor, an error for a first pixel of a plurality of pixels in a first row;

diffusing, by the processor, the error to an adjacent pixel of the plurality of pixels in the first row;

performing, by the processor, the quantizing and the diffusing for each remaining pixel of the plurality of pixels in the first row; and applying, by the processor, the error that is quantized for each one of the plurality of pixels in the first row in a desired number of different directions in a plurality of parallel operations that is equal to the desired number of different directions.

2. The method of claim 1, further comprising:

repeating, by the processor, the quantizing, the diffusing, the performing and the applying for each row of a plurality of rows.

3. The method of claim 2, wherein the repeating is performed in a raster scan order.

4. The method of claim 2, wherein the repeating is performed in a serpentine scan order.

5. The method of claim 1, wherein the adjacent pixel comprises a next pixel in a direction of a horizontal scan.

6. The method of claim 1, wherein the processor comprises a single instruction multiple data (SIMD) processor.

7. The method of claim 6, wherein the SIMD processor is part of a digital front end (DFE).

8. The method of claim 1, wherein the error diffusion is applied to a half-tone image path.

9. The method of claim 1, wherein the error is associated with converting a pixel value into a binary representation.

10. A non-transitory computer-readable medium storing a plurality of instructions which, when executed by a processor, cause the processor to perform operations for performing error diffusion, the operations comprising:

quantizing an error for a first pixel of a plurality of pixels in a first row;

diffusing the error to an adjacent pixel of the plurality of pixels in the first row;

performing the quantizing and the diffusing for each remaining pixel of the plurality of pixels in the first row; and applying the error that is quantized for each one of the plurality of pixels in the first row in a desired number of different directions in a plurality of parallel operations that is equal to the desired number of different directions.

11. The non-transitory computer-readable medium of claim 10, further comprising:

repeating, by the processor, the quantizing, the diffusing, the performing and the applying for each row of a plurality of rows.

12. The non-transitory computer-readable medium of claim 11, wherein the repeating is performed in a raster scan order.

13. The non-transitory computer-readable medium of claim 11, wherein the repeating is performed in a serpentine scan order.

14. The non-transitory computer-readable medium of claim 10, wherein the adjacent pixel comprises a next pixel in a direction of a horizontal scan.

15. The non-transitory computer-readable medium of claim 10, wherein the processor comprises a single instruction multiple data (SIMD) processor.

16. The non-transitory computer-readable medium of claim 15, wherein the SIMD processor is part of a digital front end (DFE).

17. The non-transitory computer-readable medium of claim 10, wherein the error diffusion is applied to a half-tone image path.

18. The non-transitory computer-readable medium of claim 10, wherein the error is associated with converting a pixel value into a binary representation.

19. A method for performing error diffusion, comprising:

receiving, by a single instruction multiple data (SIMD) processor, a selection for diffusing a quantizing error in k directions for a half tone image;

quantizing, by the SIMD processor, the quantization error associated with converting a pixel to a binary representation for the half tone image for each one of N pixels in a first row;

diffusing, by the SIMD processor, the quantization error to a next adjacent pixel in a direction of a horizontal scan for the each one of N pixels in the first row;

generating, by the SIMD processor, a plurality of k−1 parallel vector Multiply-Add SIMD operations for diffusing the quantization error for the each one of the N pixels in the first row in k−1 different directions;

performing, by the SIMD processor, the k−1 parallel vector Multiply-Add SIMD operations simultaneously; and repeating, by the SIMD processor, the quantizing, the diffusing, the generating and the performing for each remaining row of a plurality of rows the half tone image.

20. The method of claim 19, wherein the repeating is performed in a raster scan order or a serpentine scan order.

* * * * *